No. 873,922. PATENTED DEC. 17, 1907.
N. B. CONVERSE.
APPARATUS FOR PREPARING AND PACKING SEEDED RAISINS.
APPLICATION FILED OCT. 23, 1905.

3 SHEETS—SHEET 2.

Witness
Chas. E. Chapin.
Bessie Gorfinkel.

Inventor
N. B. Converse
By
F. W. Wright,
Attorney

No. 873,922. PATENTED DEC. 17, 1907.
N. B. CONVERSE.
APPARATUS FOR PREPARING AND PACKING SEEDED RAISINS.
APPLICATION FILED OCT. 23, 1905.

3 SHEETS—SHEET 3.

UNITED STATES PATENT OFFICE.

NEWTON B. CONVERSE, OF FRESNO, CALIFORNIA, ASSIGNOR, BY DIRECT AND MESNE ASSIGNMENTS, TO HIMSELF AND J. E. DICKINSON, TRUSTEES, OF FRESNO, CALIFORNIA.

APPARATUS FOR PREPARING AND PACKING SEEDED RAISINS.

No. 873,922.     Specification of Letters Patent.     Patented Dec. 17, 1907.

Application filed October 23, 1905. Serial No. 283,979.

*To all whom it may concern:*

Be it known that I, NEWTON B. CONVERSE, a citizen of the United States, residing at Fresno, in the county of Fresno and State of California, have invented certain new and useful Improvements in Preparing and Packing Apparatus for Seeded Raisins, of which the following is a specification.

This invention relates to an apparatus for preparing and packing seeded raisins, or other fruits, the object of the invention being to provide an apparatus for the above purpose which will be efficient in operation and in which all the parts shall be under unitary control.

Figure 1:
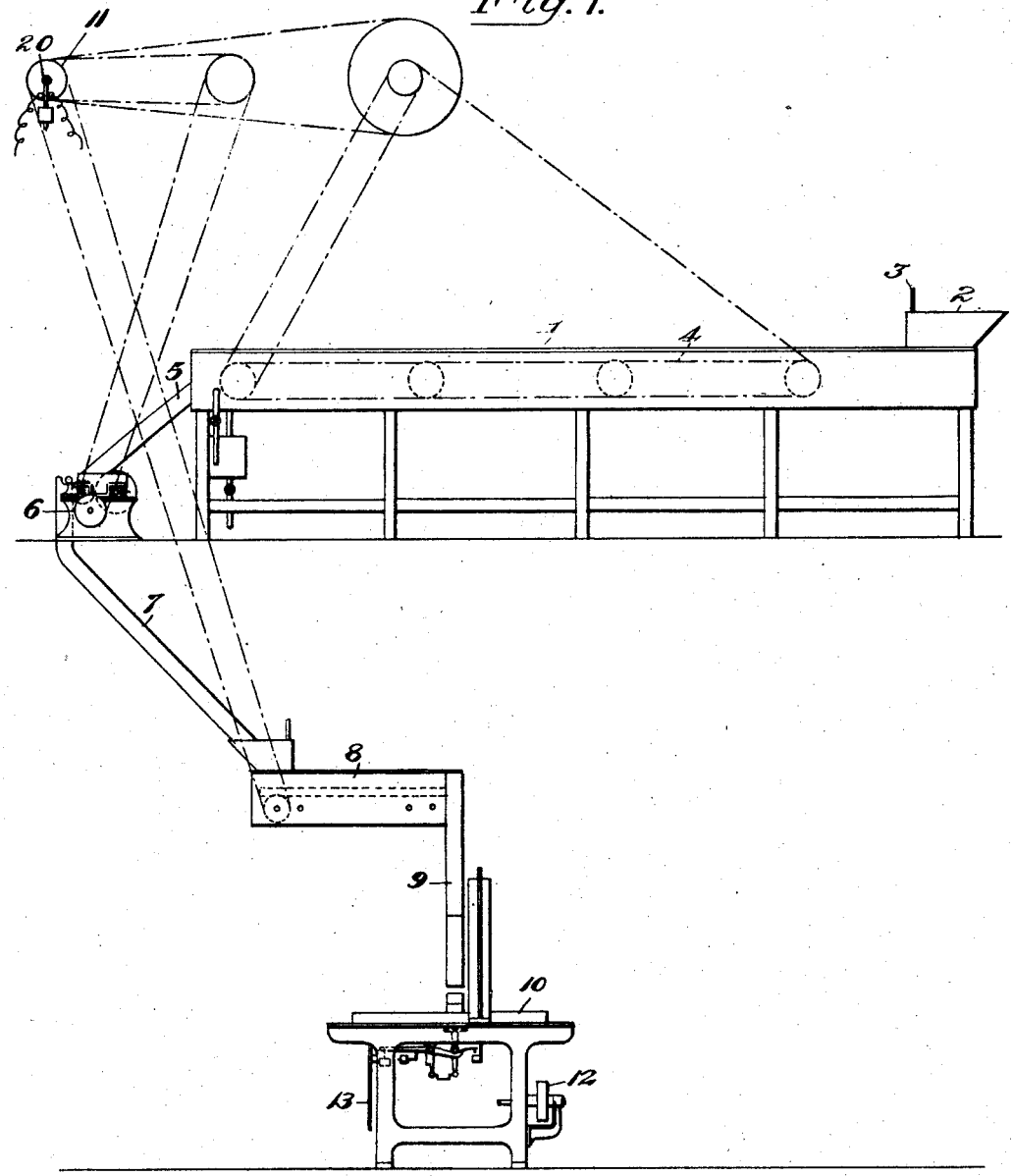
Figure 2:
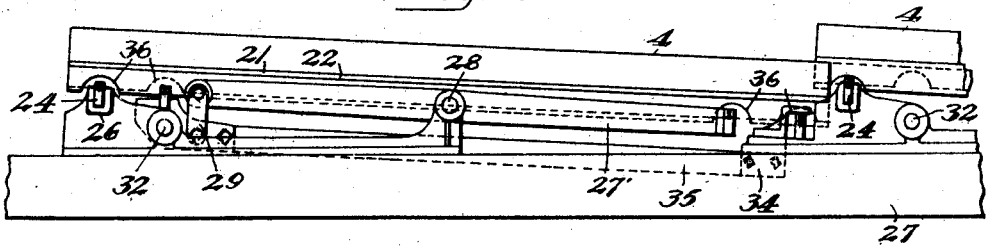
Figure 3:
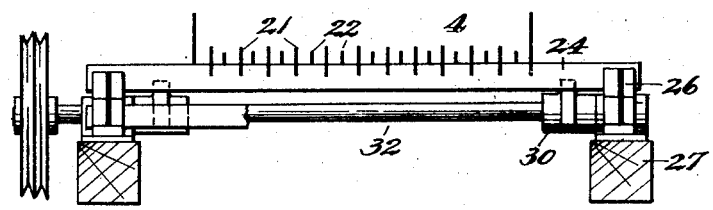
Figure 4:
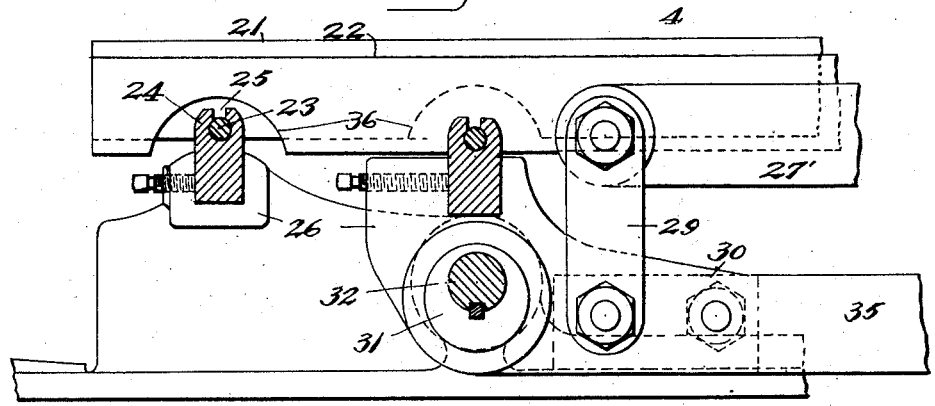
Figure 5:
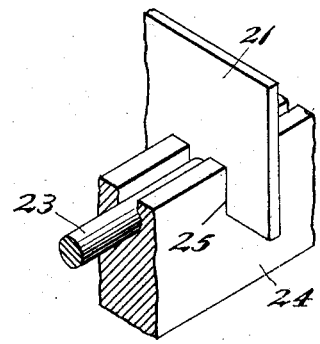
Figure 6:
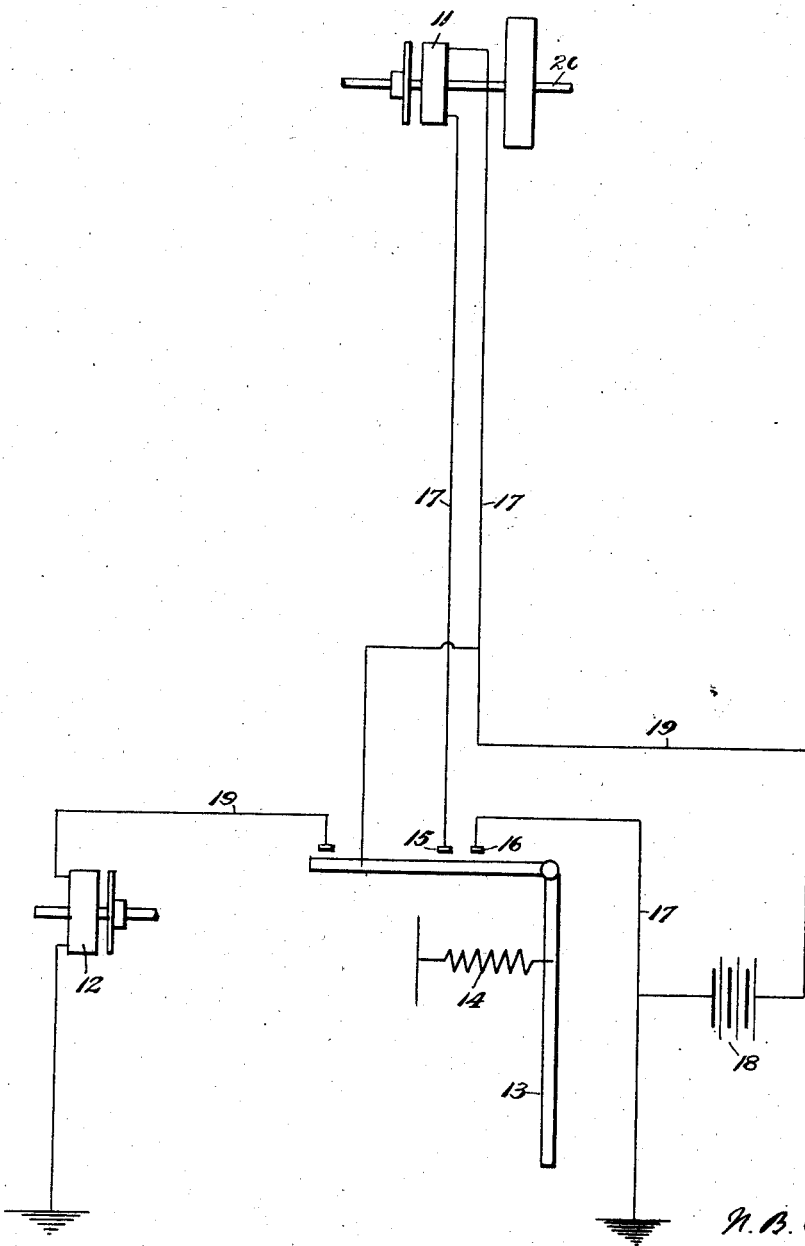

In the accompanying drawing, Figure 1 is a view of the whole apparatus certain parts being shown diagrammatically; Fig. 2 is a side elevation of part of a series of conveyers; Fig. 3 is an end view of the same; Fig. 4 is an enlarged side view of the ends of the conveyer blades; Fig. 5 is a broken perspective view of a blade and its supports; Fig. 6 is a diagrammatic view of the electrical connections.

Referring to the drawing, 1 represents the casing of a sweating machine. This sweater should be of a character tending to distribute the raisins, and produce uniform flow thereof, and for this purpose I prefer the construction disclosed in my application for patent on apparatus for sweating raisins filed Aug. 15, 1905, Serial Number 274,272. Such a machine comprises a hopper 2, into which the raisins or other fruit are fed from a suitable distributer and from which the discharge is controlled by an adjustable gate 3. Below said gate the raisins are discharged on to the first of a series of conveyers 4, these conveyers being in a substantial horizontal series extending the length of the chamber of the sweater. Each set of conveyers slopes slightly upwards and discharges at its forward end on to the rear end of the next set. The conveyer comprises two sets of conveyer blades 21, 22, alternating with each other. The blades 21 of one set are pivoted at their forward ends upon a rod 23 secured in a support 24 which is grooved, as shown at 25, to receive said blades, the support being secured in stationary blocks 26 supported upon side beams 27. The rear ends of the blades are similarly supported by blocks secured to the rear ends of levers 27 fulcrumed at 28, the front ends of said levers being attached by links 29 to saddles 30 carried on the rings of eccentrics 31 mounted upon a transverse shaft 32 driven from any suitable source of power. By this means a vertically oscillating motion is imparted to the blades 21. The other set of blades 22 are given a double movement, their forward ends having a movement of revolution while the rear ends are given a movement of longitudinal reciprocation. The revolution of the forward ends is caused by their supporting blocks 26 being secured to the saddles 30, while the rear ends receive their longitudinal reciprocation by their blocks being attached to castings 34, connected by links 35 with the saddles 30. The blades of each set are recessed on their under side, as shown at 36, to allow freedom of movement, where they pass over the supports for the other set. By means of the movements of these two sets of blades, alternating with each other, the raisins are caused to advance. At both ends the second set of blades advance when above the first set, and move backwards when below them, said set having no longitudinal movement. When the blades of the second set advance, they carry the raisins forward, but when they move back, they leave the raisins resting on the blades of the first set. The advantage of this construction is that the raisins are fed uniformly through the sweater and emerge at a uniform flow.

From the sweating machine the raisins are discharged by the last conveyer therein into a chute 5 which leads to a seeding machine 6, which in turn leads by a chute 7 to a conveyer 8 which discharges into the spout 9 of a packing machine 10 in which they are discharged into the carton on the weighing scales and packed.

It is important for the successful operation of the machine that all the several devices disclosed herein should be operated in unison. For this purpose the main shaft 20 which actuates the sweater and seeder, is controlled by an electro magnetic clutch 11, and the packing machine is also controlled by an electro magnetic clutch 12. These clutches are energized when the machine is in operation, and to stop the machinery the circuits through the clutches are broken by means of a lever 13, the movement of which against the spring 14 breaks contact between two contact points 15, 16, in a circuit 17 through the generator 18, and through the electro magnetic clutch 11. It also breaks a circuit 19 through the electro magnetic clutch 12 and the ground and operates said clutch to stop the packing machine.

It is understood that the invention is not limited to any particular form of packing machine. The novel ideas embodied in this invention is to provide machinery which will take advantage of the fact that said raisins may be readily distributed in a uniform layer when they are dry and hard whereas it is difficult to so distribute them when they are softened by the sweating process and particularly when they have passed through the seeding machine. But by so distributing them when they are dry and hard before passing through the sweater and providing apparatus which will maintain them uniformly distributed during their whole course to the packing machine, they are fed to said packing machine uniformly, thereby rendering it possible to pack them in uniform quantities without variation of weight.

I claim:—

In an apparatus for preparing and packing seeded raisins, the combination of a sweating chamber, a seeding machine, a packing machine, means for feeding the raisins to the sweating chamber in a uniformly flowing stream, means for maintaining them in a uniformly flowing stream while in said chamber, means for transferring them in a uniformly flowing stream from the sweating chamber to the seeding machine, means for transferring them in a uniformly flowing stream from the seeding machine to the packing machine, and means for simultaneously controlling all of the above mechanism, substantially as described.

In witness whereof I have hereunto set my hand in the presence of two subscribing witnesses.

NEWTON B. CONVERSE.

Witnesses:
 D. A. CASLINE,
 L. B. HAYHURST.